United States Patent
Renau

(10) Patent No.: US 6,816,670 B1
(45) Date of Patent: Nov. 9, 2004

(54) FLUID HEAT EXCHANGING SYSTEM AND METHOD

(75) Inventor: Karol Renau, Calabasas, CA (US)

(73) Assignee: Renau Corporation, Chatsworth, CA (US)

(*) Notice: Subject to any disclaimer, the term of this patent is extended or adjusted under 35 U.S.C. 154(b) by 11 days.

(21) Appl. No.: 09/812,711

(22) Filed: Mar. 19, 2001

(51) Int. Cl.[7] .............................................. F24C 13/00
(52) U.S. Cl. ..................... 392/467; 392/478; 392/484
(58) Field of Search ................................ 392/465, 466, 392/467, 478, 484, 339, 340–346

(56) References Cited

U.S. PATENT DOCUMENTS

| 941,215 A | * | 11/1909 | Wade | 392/494 |
| 3,710,985 A | * | 1/1973 | Baum | 222/146.3 |
| 4,343,988 A | * | 8/1982 | Roller et al. | 392/467 |
| 4,508,957 A | * | 4/1985 | Rocchitelli | 392/479 |
| 4,888,465 A | * | 12/1989 | Hoffmann | 392/467 |

FOREIGN PATENT DOCUMENTS

GB          2035764 A    *   6/1980   ............. F24H/1/10

* cited by examiner

Primary Examiner—Thor Campbell
(74) Attorney, Agent, or Firm—Fulwider Patton Lee & Utecht, LLP

(57) ABSTRACT

In a system and method for exchanging heat with a fluid, for heating the fluid, the system includes a heat exchanger, for exchanging heat with a fluid so as to heat the fluid, adapted to store heat energy, and to enable heat energy to be exchanged with the fluid to heat the fluid. The heat exchanger enables the fluid to rapidly attain and maintain a stable heated fluid temperature, and a stable fluid dispensing temperature. The system further includes a fluid inlet, for enabling the fluid to flow into the heat exchanger, and a fluid outlet, for enabling the heated fluid to flow out of the heat exchanger. The heat exchanger has a channel therein, adapted to enable the fluid to flow thereinto and therefrom, and to enable the fluid to be retained therein for efficient and effective heating of the fluid.

44 Claims, 2 Drawing Sheets

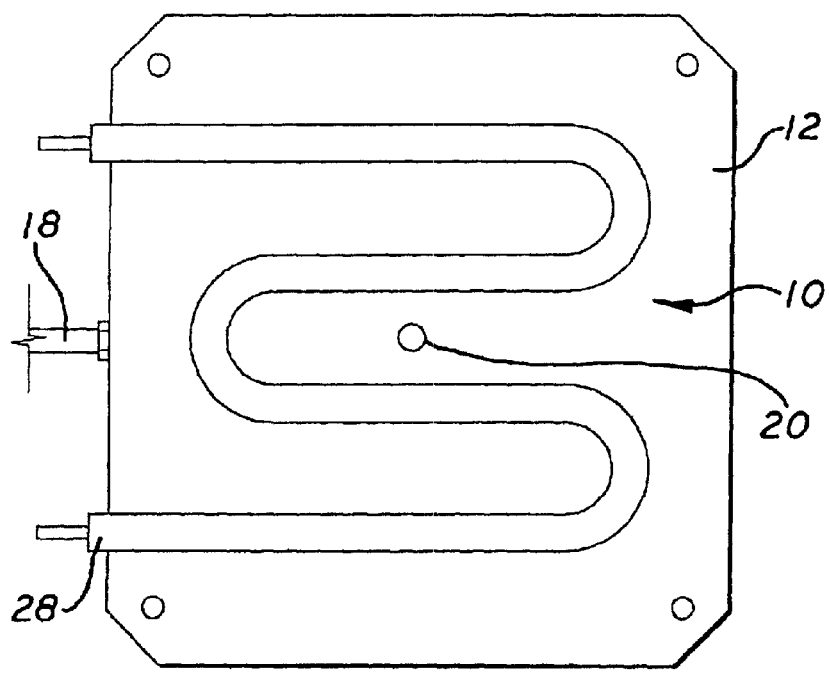
FIG. 3
FIG. 4
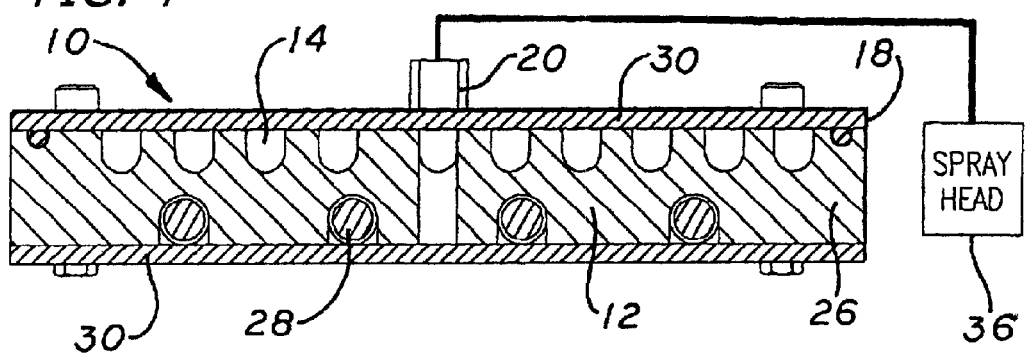

FLUID HEAT EXCHANGING SYSTEM AND METHOD

BACKGROUND OF THE INVENTION

1. Field of the Invention

This invention relates generally to improvements in heat exchanging systems and methods. In particular, the present invention relates to a heat exchanger system which exchanges heat with a fluid, to provide efficient heating of the fluid, for effective dispensing of the heated fluid.

2. Description of the Related Art

In a system such as a fluid heating and dispensing system, such as a coffeemaker, which includes a tank for containing a fluid such as water, the fluid is heated, and the heated fluid is mixed with another component such as coffee, to enable the dispensing of a heated mixture such as heated coffee. Such a system further includes a heating element adapted to be in direct contact with the fluid in the tank, and a dump valve for enabling the dispensing of the heated mixture.

However, in heating the fluid in the tank, the fluid passes through the tank for heating thereof for only a relatively short time, making heating thereof less efficient. Moreover, the fluid temperature attained by direct contact of the heating element with the fluid is relatively unstable.

Therefore, the present invention provides improved systems and methods for enabling heat to be effectively exchanged with a fluid, so as to attain and maintain the fluid at a stable heated fluid temperature, and to enable the fluid to be heated substantially rapidly to a stable higher fluid dispensing temperature for dispensing thereof.

SUMMARY OF THE INVENTION

Briefly, and in general terms, the present invention provides a new and improved system and method for exchanging heat with a fluid for heating the fluid, so as to enable the efficient dispensing of heated fluid.

By way of example, and not by way of limitation, the present invention provides a new and improved system for exchanging heat with a fluid, for heating the fluid. The system includes a heat exchanger, for exchanging heat with a fluid so as to heat the fluid. The heat exchanger is adapted to store heat energy, and to enable heat energy to be exchanged with the fluid to heat the fluid. The heat exchanger has a channel therein, adapted to enable the fluid to flow thereinto and therefrom, and to enable the fluid to be retained therein. The system also includes a fluid inlet, for enabling the fluid to flow into the heat exchanger, and a fluid outlet, for enabling the heated fluid to flow out of the heat exchanger.

More particularly, for example, the heat exchanger of the present invention includes a storing element for storing heat, and a heating element for heating the storing element. The channel in the heat exchanger is generally spiral-shaped. The heating element is generally m-shaped. The heat exchanger is adapted to retain heat, such that, upon turning off the fluid inlet after dispensing heated fluid through the fluid outlet, any fluid remaining in the heat exchanger evaporates through the fluid outlet responsive thereto.

The above objects and advantages of the present invention, as well as others, are described in greater detail in the following description, when taken in conjunction with the accompanying drawings of illustrative embodiments.

BRIEF DESCRIPTION OF THE DRAWINGS

FIG. 3 is a bottom view of a heating element, with a bottom cover thereof removed, pursuant to the invention; and FIG. 4 is a side cross-sectional view of a heat exchanger, in accordance with the present invention.

DETAILED DESCRIPTION OF THE PREFERRED EMBODIMENTS

Figure 1:
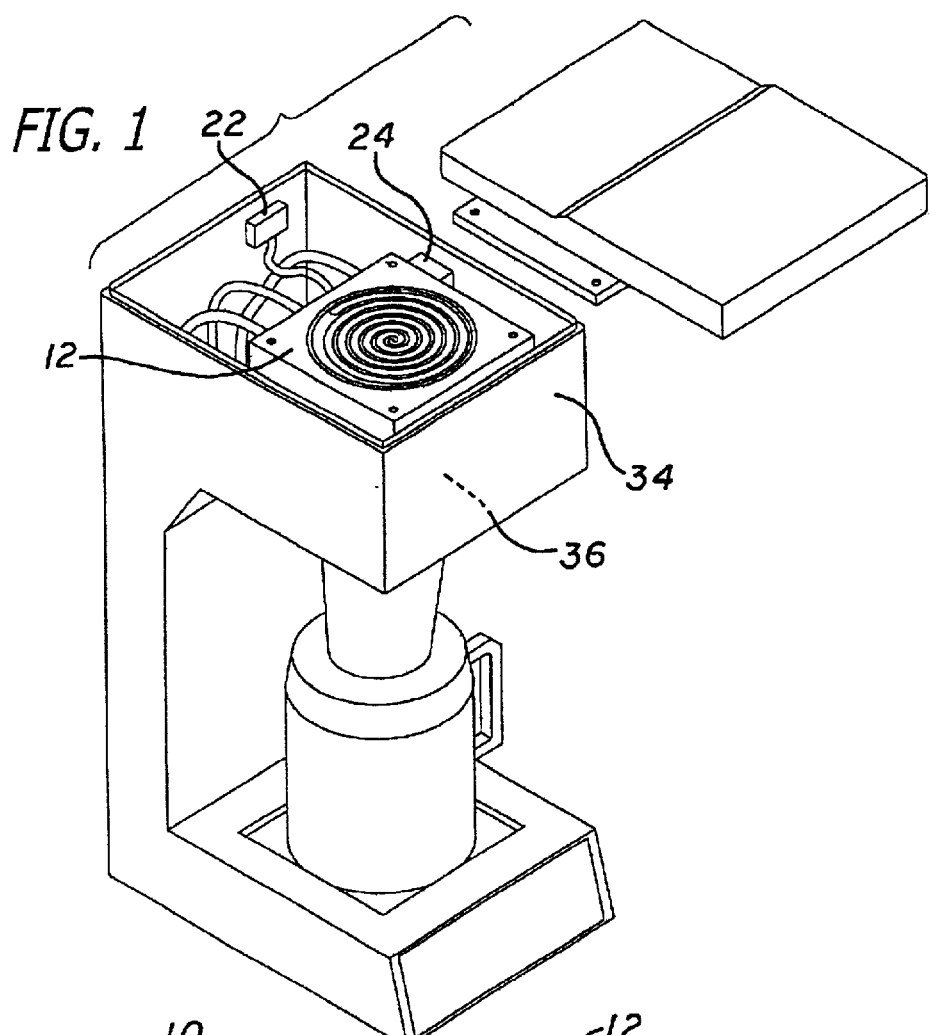
FIG. 1 is a perspective view of a heated fluid dispensing system, with a top cover and a top plate thereof displaced from the top thereof, in accordance with an embodiment of the present invention.

The present invention is directed to an improved system and method for exchanging heat with a fluid for heating the fluid in an efficient and effective manner. The improved system and method provides effective and efficient fluid heating through heat exchanging. The preferred embodiments of the improved system and method are illustrated and described herein by way of example only and not by way of limitation.

Referring to the drawings, wherein like reference numerals denote like or corresponding parts throughout the drawing figures, and particularly to FIGS. 1–4, in a preferred embodiment of a system in accordance with the invention for example, a system 10 is provided for exchanging heat with a fluid, for heating the fluid. The system 10 includes a heat exchanger 12, for exchanging heat with a fluid so as to heat the fluid, adapted to store heat energy, and to enable heat energy to be exchanged with the fluid. The heat exchanger 12 has a channel 14 therein adapted to enable the fluid to flow thereinto and therefrom, and to enable the fluid to be retained therein. The heat exchanger 12 may preferably be comprised of a metal such as for example aluminum. The channel 14 is preferably generally spiral-shaped. The system 10 also includes a sealing element 16, for sealing the heat exchanger 12, to prevent fluid leakage therefrom.

The system 10 further includes a fluid inlet 18, for enabling the fluid to flow into the heat exchanger 12. The fluid inlet 18 may comprise an inlet valve. The system 10 also includes a fluid outlet 20, for enabling the heated fluid to flow out of the heat exchanger 12. The fluid outlet 20 may comprise an outlet valve. The heat exchanger 12 is adapted to retain heat such that, upon turning off the inlet valve 18 after dispensing the fluid, any fluid remaining in the heat exchanger 12 evaporates through the outlet valve 20 responsive thereto. The system 10 also includes a flow-controlling element 22, which for example comprises a flowmeter, for controlling the flow of fluid through the fluid inlet valve 18 into the heat exchanger 12 and through the fluid outlet valve 20 for dispensing thereof it further includes an operations-controlling element 24, for controlling the operations of the system 10. The operations-controlling element 24 comprises a processing element for processing the temperature of the heat exchanger 12, which preferably comprises a microprocessor.

Figure 2:
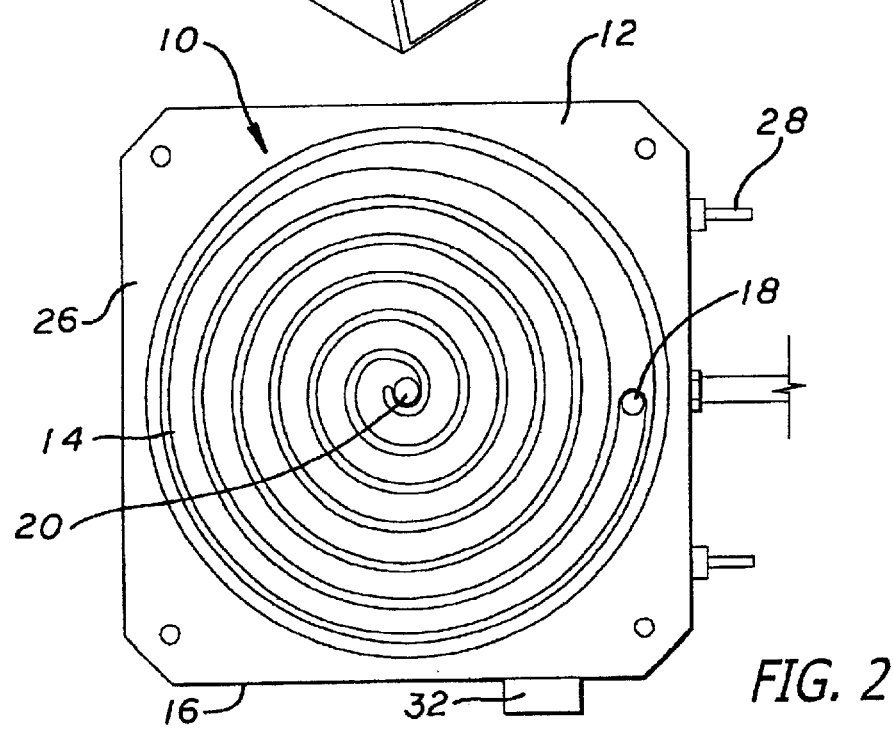
FIG. 2 is a top plan view of a storing element, with a top cover thereof removed, in the practice of the invention.

As illustrated in FIGS. 2–4, in the preferred embodiment, the heat exchanger 12 includes a storing element 26 for storing heat, and a heating element 28 for heating the storing element 26. The storing element 26 is adapted to enable fluid to be in direct contact therewith, and includes the channel 14 therein. The storing element 26 is further adapted to maintain the fluid at a heated fluid temperature, and to enable the fluid to be heated thereabove substantially rapidly to a fluid dispensing temperature. The heat exchanger 12 further includes a pair of cover plates 30 for covering the opposed sides of the storing element 26. The heating element 28 is preferably generally m-shaped, and is adapted to be connected to a power source.

Pursuant to the present invention, as shown in FIGS. 1 and 2, the system 10 further includes a sensing element 32, for sensing the temperature of the storing element 26 of the heat exchanger 12, and for controlling and stabilizing the temperature thereof. The sensing element 32 is adapted to sense and process the temperature of the storing element 26, and includes for example a microprocessor.

In the present invention, as seen in FIGS. 1 and 4, the system 10 preferably is adapted to be incorporated in a device 34 such as a coffeemaker, for dispensing a heated fluid such as heated coffee, which device 34 includes the heat exchanger 12 therein. The heat exchanger 12 is preferably located generally in the upper portion of the dispensing device 34. The dispensing device 34 further includes an outlet 36 for dispensing the heated fluid, which outlet 36 for example may comprise a fluid spray head. The location of the heat exchanger 12 in the upper portion of the dispensing device 34 provides direct access to the fluid spray head outlet 36.

Referring to FIGS. 1–4, in the preferred method of operation of the system 10 of the invention, for example, the fluid inlet 18 is opened to enable the fluid to flow therethrough into the heat exchanger 12. The fluid flows into the channel 14 in the heat exchanger, and, with the fluid outlet 20 closed, the fluid is retained in the heat exchanger 12. Heat is exchanged in the heat exchanger 12 with the fluid, so as to heat the fluid and store heat energy. The storing element 26 is heated by the heating element 28, and heat is stored by the storing element 26, for exchanging heat in the heat exchanger 12. The fluid in the channel 14 is in direct contact with the heat exchanger 12 for exchanging heat. Upon exchanging heat with the heat exchanger 12, the fluid in the channel 14 is maintained therein in the sealed heat exchanger 12 at a heated fluid temperature, and is substantially rapidly heated thereabove to a fluid dispensing temperature as actuated prior to dispensing thereof. The fluid outlet 20 is opened to enable heated fluid to flow therethrough out of the heat exchanger 12.

As shown in FIGS. 1–2, the heated fluid is enabled to flow out of the heat exchanger 12 and through the fluid outlet 20, for dispensing thereof through the fluid spray head 36 in the dispensing device 34. The flow-controlling element 22, such as a flowmeter for example, controls the flow of the fluid from the fluid outlet 20 for dispensing thereof. The fluid inlet 18 is turned off after dispensing of the fluid through the dispensing device 34, the retained heat in the heat exchanger 12 heats any fluid remaining in the heat exchanger 12, and the fluid remaining in the heat exchanger 12 evaporates through the fluid outlet 20 responsive thereto. The operations-controlling element 24 controls the operations of the system 10.

While the present invention has been described in connection with the specific embodiments identified herein, it will be apparent to those skilled in the art that many alternatives, modifications and variations are possible in light of the foregoing description. Accordingly, the invention is intended to embrace all such alternatives, modifications and variations as may fall within the spirit and scope of the invention as disclosed herein.

What is claimed is:

1. A system for exchanging heat with a fluid, for heating the fluid, comprising:

a heat exchanger, for exchanging heat with a fluid so as to heat the fluid, adapted to store heat energy, and to enable heat energy to be exchanged with the fluid to wheat the fluid, having a channel therein adapted to enable the fluid to flow thereinto and therefrom, and to enable the fluid to be retained therein, comprising:

a heating element, for heating the fluid;

a channel, for enabling the fluid to flow thereinto and therefrom, and for enabling the fluid to be stored therein; and a storing element, for enabling the storing of fluid in the channel, the heating of the fluid stored in the channel by the heating element to a stored heated fluid temperature, and the maintaining of the fluid in the channel at the stored heated fluid temperature, and for enabling the fluid to be substantially rapidly heated by the heating element to a fluid dispensing temperature above the stored heated fluid temperature for dispensing of the fluid.

2. The system of claim 1, wherein the heat exchanger is comprised of aluminum.

3. The system of claim 1, further comprising a sealing element for sealing the heat exchanger.

4. The system of claim 1, further comprising a fluid inlet.

5. The system of claim 1, further comprising a fluid outlet.

6. The system of claim 1, further comprising a sensing element for sensing the temperature of the heat exchanger, and for controlling and stabilizing the temperature thereof.

7. The system of claim 1, further comprising a system for dispensing the fluid, which includes the heat exchanger therein.

8. The system of claim 1, further comprising a fluid inlet, for enabling the fluid to flow into the channel, and a fluid outlet, for enabling the fluid to flow out of the channel, and wherein the storing element is further adapted to retain heat, such that, upon turning off the heating element and the fluid inlet after dispensing fluid, any fluid remaining in the channel evaporates through the fluid outlet responsive thereto.

9. The system of claim 1, further comprising a flow-controlling element for controlling the flow of the fluid from the fluid outlet for dispensing thereof.

10. The system of claim 1, further comprising an operation-controlling element for controlling the operation of the system.

11. The system of claim 1, wherein the storing element is adapted to enable the fluid to be in direct contact therewith.

12. The system of claim 1, wherein the heating element is generally m-shaped.

13. The system of claim 1, wherein the heating element is adapted to be connected to a heating source.

14. The system of claim 1, wherein the channel is in the shape of a spiral.

15. The system of claim 7, wherein the heat exchanger is located generally in the upper portion of the fluid dispensing system.

16. The system of claim 7, wherein the fluid dispensing system further includes an outlet for dispensing the heated fluid.

17. The system of claim 9, wherein the flow-controlling element comprises a flowmeter.

18. The system of claim 10, wherein the operation-controlling element comprises a processing element for processing the temperature of the heat exchanger.

19. The system of claim 16, wherein the fluid dispensing outlet comprises a fluid spray head.

20. The system of claim 18, wherein the processing element comprises a microprocessor.

21. The system of claim 3, wherein the sealing element comprises a pair of plates, in which each plate is relatively thin, and the storing element is located between the pair of sealing element plates, and comprises a storing element plate which is relatively thick, wherein the thickness of the storing element plate is substantially greater than the thickness of each relatively thin sealing element plate, such that the storing element plate is adapted to retain heat for a substantial period of time to maintain the fluid at the heated fluid temperature.

22. A system for exchanging heat with a fluid, for heating the fluid, comprising:

heat exchanging means, for exchanging heat with a fluid so as to heat the fluid, comprising:

heating means, for heating the fluid;

a channel, for enabling the fluid to flow thereinto and therefrom, and for enabling the fluid to be stored therein; and storing means, for enabling the storing of fluid in the channel, the heating of the fluid stored in the channel by the heating element to a stored heated fluid temperature, and the maintaining of the fluid in the channel at the stored heated fluid temperature, and for enabling the fluid to be substantially rapidly heated by the heating means to a fluid dispensing temperature above the stored heated fluid temperature for dispensing of the fluid.

23. A method of exchanging heat with a fluid, for heating the fluid, in a system which comprises a heat exchanger, for exchanging heat with a fluid so as to heat the fluid, comprising a heating element, for heating the fluid, a channel, for enabling the fluid to flow thereinto and therefrom, and for enabling the fluid to be stored therein and a storing element, for enabling the storing of fluid in the channel, the heating of the fluid stored in the channel to a stored heated fluid temperature, and the maintaining of the fluid in the channel at the stored heated fluid temperature, and for enabling the fluid to be substantially rapidly heated by the heating element to a fluid dispensing temperature above the stored heated fluid temperature for dispensing of the fluid, wherein the method comprises:

heating the fluid in the channel, by the heating element; and heating and maintaining the heating of the fluid stored in the channel at the stored heated fluid temperature, by the storing element, for enabling the fluid to be substantially rapidly heated by the heating element to the fluid dispensing temperature above the stored heated fluid temperature for dispensing of the fluid.

24. The method of claim 23, wherein the heat exchanger is comprised of aluminum, and wherein exchanging heat comprises exchanging heat with the fluid in the aluminum heat exchanger.

25. The method of claim 23, further comprising a sealing element for sealing the heat exchanger, further comprising sealing the heat exchanger.

26. The method of claim 23, further comprising a fluid inlet, and further comprising a fluid inlet flow which comprises enabling the fluid to flow through the fluid inlet.

27. The method of claim 23, further comprising a fluid outlet, and further comprising a fluid outlet flow which comprises enabling the fluid to flow through the fluid outlet.

28. The method of claim 23, further comprising a sensing element for sensing the temperature of the heat exchanger and for controlling and stabilizing the temperature thereof, further comprising sensing the temperature of the heat exchanger and controlling and stabilizing the temperature thereof.

29. The method of claim 23, further comprising a system for dispensing the fluid, which includes the heat exchanger therein, further comprising dispensing the fluid from the fluid dispensing system.

30. The method of claim 23, further comprising a fluid inlet, for enabling the fluid to flow into the channel, and wherein the storing element is further adapted to retain heat, such that, upon turning off the heating element and the fluid inlet after dispensing fluid, any fluid remaining in the channel evaporates through the fluid outlet responsive thereto, further comprising evaporating any fluid remaining in the channel, after dispensing fluid, responsive to the retained heat in the storing element.

31. The method of claim 23, further comprising a fluid outlet, for enabling the fluid to flow out of the channel, and a flow-controlling element for controlling the flow of the fluid from the fluid outlet for dispensing thereof, and further comprising controlling the flow of the fluid from the fluid outlet for dispensing thereof.

32. The method of claim 23, further comprising an operation-controlling element for controlling the operation of the system, further comprising controlling the operation of the system.

33. The method of claim 23, wherein the storing element is adapted to enable the fluid to be in direct contact therewith, and wherein exchanging heat comprises enabling fluid to be in direct contact with the storing element.

34. The method of claim 25, wherein the sealing element comprises a pair of plates, in which each plate is relatively thin, and the storing element is located between the pair of sealing element plates, and comprises a storing element plate which is relatively thick, wherein the thickness of the storing element plate is substantially greater than the thickness of each relatively thin sealing element plate, such that the storing element plate is adapted to retain heat for a substantial period of time to maintain the fluid at the heated fluid temperature, and wherein storing further comprises storing fluid heated to the heated fluid temperature in the relatively thick storing element plate so as to retain heat for a substantial period of time to maintain the fluid at the heated fluid temperature.

35. The method of claim 23, wherein the heating element is generally m-shaped, and wherein exchanging heat further comprises heating the storing element through the generally m-shaped heating element.

36. The method of claim 23, wherein the heating element is adapted to be connected to a power source, and wherein exchanging heat further comprises heating the heating element upon actuating the power source.

37. The method of claim 23, wherein the channel is in the shape of a spiral, and wherein exchanging heat further comprises enabling fluid to flow into the spiral-shaped channel.

38. The method of claim 29, wherein the heat exchanger is located generally in the upper portion of the fluid dispensing system, and wherein exchanging heat further comprises exchanging heat in the generally upper portion of the fluid dispensing system.

39. The method of claim 29, wherein the fluid dispensing system further includes an outlet for dispensing the heated fluid, and wherein dispensing further comprises dispensing the fluid from the heated fluid dispensing outlet.

40. The method of claim 31, wherein the flow-controlling element comprises a flowmeter, and wherein controlling further comprises controlling the flow of the fluid in the flowmeter.

41. The method of claim 32, wherein the operation-controlling element comprises a processing element for processing the temperature of the heat exchanger, and wherein operation-controlling further comprises processing the temperature of the heat exchanger.

42. The method of claim 38, wherein the fluid dispensing outlet comprises a fluid spray head, and wherein dispensing further comprises dispensing through the fluid spray head.

43. The method of claim 41, wherein the processing element comprises a microprocessor, and wherein sensing further comprises processing through a microprocessor.

44. A method of exchanging heat with a fluid, for heating the fluid, in a system which comprises heat exchanging means, for exchanging heat with a fluid so as to heat the fluid, comprising heating means, for heating the fluid, a channel, for enabling the fluid to flow thereinto and therefrom, and for enabling the fluid to be stored therein, and storing means, for enabling the storing of fluid in the channel, the heating of the fluid stored in the channel by the heating means at a stored heated fluid temperature, and the maintaining of the fluid in the channel at the stored heated fluid temperature, and for enabling the fluid to be substantially rapidly heated by the heating means to a fluid dispensing temperature above the stored heated fluid temperature for dispensing of the fluid, wherein the method comprises:

heating the fluid in the channel, by the heating means; and heating and maintaining the heating of the fluid stored in the channel at the stored heated fluid temperature, by the storing means, for enabling the fluid to be substantially rapidly heated by the heating means to the fluid dispensing temperature above the stored heated fluid temperature for dispensing of the fluid.

* * * * *